US007881944B2

(12) United States Patent
Heller et al.

(10) Patent No.: US 7,881,944 B2
(45) Date of Patent: Feb. 1, 2011

(54) AUTOMATIC FEEDBACK AND PLAYER DENIAL

(75) Inventors: Noah Heller, Kirkland, WA (US);
Karen L. Carter-Schwendler, Kirkland, WA (US); Damon V. Danieli, Clyde Hill, WA (US); Sean J. Huberty, Woodinville, WA (US); Glenn M. Doren, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1270 days.

(21) Appl. No.: 10/151,793

(22) Filed: May 20, 2002

(65) Prior Publication Data

US 2003/0216962 A1 Nov. 20, 2003

(51) Int. Cl.
*G06Q 10/00* (2006.01)

(52) U.S. Cl. .......................................... 705/1
(58) Field of Classification Search ............ 705/10, 705/1
See application file for complete search history.

(56) References Cited

U.S. PATENT DOCUMENTS

| 6,582,380 | B2* | 6/2003 | Kazlausky et al. | 600/595 |
| 6,952,678 | B2* | 10/2005 | Williams et al. | 705/1 |
| 2002/0103805 | A1* | 8/2002 | Canner et al. | 707/100 |
| 2002/0161664 | A1* | 10/2002 | Shaya et al. | 705/26 |
| 2002/0198940 | A1* | 12/2002 | Bower et al. | 709/204 |
| 2003/0101091 | A1* | 5/2003 | Levin et al. | 705/11 |

FOREIGN PATENT DOCUMENTS

| JP | 2001-184288 | 7/2001 |
| JP | 2001-516107 | 9/2001 |
| JP | 2002-032319 | 1/2002 |

OTHER PUBLICATIONS

Waldmeir, Patti, Sense of shame that underpins online civilisation: The world of internet auctions contains no law but plenty of order—thanks to trust and 'positive feedback':; [USA edition] Jul. 6, 2000, Financial Times. London (UK).*

Tiwana, Amrit; Bush, Ashley; "A social exchange architecture for distributed Web communities" 2001, Journal of Knowledge Management, Kempston:.vol. 5, Iss. 3; p. 242, 7 pgs.*

(Continued)

*Primary Examiner*—Jonathan G Sterrett

(57) ABSTRACT

Automatically maintaining behavioral standards of an electronic community in response to feedback from members of the electronic community. Feedback is submitted regarding behavior of a specified member. If the feedback exceeds a threshold representing a behavioral standard of the electronic community for a category, an action is automatically implemented directed to the specified member. Each threshold may be adjusted as a function of the number of members or of other criteria. The feedback may also be used to rate a specific member and to enable other members to choose whether to interact with the specific member. Sanctions or rewards may be implemented, including limiting communication, suspending or terminating access, granting additional privileges, assigning the specified member to a subgroup of the electronic community, and other actions. Community standards can thus be automatically maintained and enforced for gaming, communication, commerce, collaborative work, or other electronic activities.

15 Claims, 10 Drawing Sheets

OTHER PUBLICATIONS

Williams, Ruth L; Cothrel, Joseph; "Four Smart Ways to Run Online Communities", Summer 2000, Sloan Management Review.. vol. 41, Iss. 4; p. 81 (11 pages).*

Richards, Gary; "Panel hopes to bring order to traffic court", Feb. 28, 1993, San Jose Mercury News, Morning Final Edition, p. 1A, Dialog 07039136.*

Gil McWilliam, Building Stronger Brands through Online Communities Sloan Management Review. Spring 2000. vol. 41, Iss. 3; p. 43 (12 pages).*

Barry Wellman, Keith Hampton; "Living networked on and offline", Nov. 1999, Contemporary Sociology. Washington:.vol. 28, Iss. 6; p. 648, 7 pgs.*

Nina Schuyler; "Going . . . going . . . gotcha!", Oct. 2000, PC World. San Francisco:.vol. 18, Iss. 10; p. 181, 6 pgs.*

Paul Jansen, Daniel Vloeberghs; "Multi-rater feedback methods: personal and organizational implications", 1999, Journal of Managerial Psychology. Bradford:.vol. 14, Iss. 6; p. 455.*

Mark Leibovich, "eBay, 'Cyburbia's' New Subdivision, Stokes a Boom; With an Emphasis on Community, Internet Auction Site Struggles With Growth"; Jan. 31, 1999, The Washington Post. Washington, D.C.:. p. A.01.*

PR Newswire, "eBay Launches the Most Comprehensive Trust and Safety Upgrades to The World's Largest Person-To-Person Trading Site", Jan. 15, 1999, New York:. p. 1.*

Church, Alan; Bracken, David; "Advancing the state of the art of 360-degree feedback", 1997, Sage Publications—Group & Organizational Studies, 22, 2; ABI/INFORM Global, p. 149.*

Ostrom, Elinor; "Governing the Commons—The Evolution of Institutions for Collective Action", (c) 1990 Cambridge University Press, pp. 90, 94-99, 187.*

Zacharia, et al; "Collaborative Reputation Mechanisms in Electronic Marketplaces", MIT Media Lab, © IEEE 1999, Proceedings of the 32nd Hawaii International Conference on System Sciences, pp. 1-7.*

Muller, Michael J; Friedman, Jessica; "Electronic Communities: Places and Spaces, Contents and Boundaries", CHI 2000, Apr. 1-6, 2000, Lotus Development Corporation, Workshop, p. 373.*

Donath, Judy S; "Identity and Deception in the Virtual Community", Aug. 4, 1998, pp. 1-26, MIT Media Lab.*

"Immunizing online reputation reporting systems against unfair ratings and discriminatory behavior", Proceedings of the 2nd ACM conference on Electronic commerce, Minneapolis, Minnesota, United States, Year of Publication: 2000, pp. 150-157.*

"Integrating Diverse Research and Development Approaches to the Construction of Social Cyberspaces", CHI 2001 WORKSHOP, Apr. 14, 2001, retrieved from the web at: http://web.archive.org/web/200104140206/www.research.microsoft.com/~shellyf/workshop.asp.*

Peter Kollock; "Design Principles for Online Communities", , University of California, Los Angeles [1], Apr. 17, 2001, retrieved from the web at: http://web.archive.org/web/20010417065527/research.microsoft.com/scg/papers/KollockPrinciples.htm.*

Manny Vellon, Kirk Marple, Don Mitchell, Steven Drucker; "The Architecture of a Distributed Virtual Worlds System", Virtual Worlds Group; Microsoft Research; Microsoft Corporation, Jun. 28, 2001, retrieved from the web at: http://web.archive.org/web/20010628032856/research.microsoft.com/scg/papers/oousenix.htm.*

"Social Computing Group", retrieved from the web at research.microsoft.com/SCG/, May 4, 2001. pp. 1-5.*

Mary M. Calkins; "My Reputation Always Had More Fun Than Me: The Failure of eBay's Feedback Model to Effectively Prevent Online Auction Fraud" Spring 2001, Richmond Law Journal, University of Richmond, vol. VII, Issue 4, retrieved from the web at: http://law.richmond.edu/JOLT/v7i4/note1.html#N_95_.*

Jensen, Carlos; Davis, John; Farnham, Shelly; "Finding Others Online: Reputation Systems for Social Online Spaces", Apr. 2002, CHI 2002, Minneapolis, Minnesota, ACM, pp. 447-454.*

Bruckman, Amy; "Approaches to Managing Deviant Behavior in Virtual Communities", CHI 94 Conference (1994), Boston, Massachusetts, p. 184.*

Kimberly Moore, Maxwell Stearns, "Law and Economics of Survivor", posted on the web 2000, retrieved from http://www.law.gmu.edu/pubs/papers/titles, pp. 1-39.*

Reputation systems umich.edu [PDF] P Resnick, K Kuwabara, R Zeckhauser, E Friedman—2000—portal.acm.org.*

Online peer review? D Wood—Learned Publishing, 1998—ingentaconnect.com.*

Discrete Prediction Games with Arbitrary Feedback and Loss (Extended Abstract) upb.de [PDF] A Piccolboni, C Schindelhauer—Computational Learning Theory, 2001—Springer.*

Identifiability of Individual Contributions in a Threshold Public Goods Experiment 1, 2, 3, R Croson, M Marks—Journal of Mathematical Psychology, 1998—Elsevier.*

Ebay Services. "The Feedback Forum." n.d.; 2 pp. Available http://pages.ebay.com/services/forum/feedback.html.

Ebay Basics. "Frequently Asked Questions about Feedback." n.d.; 4 pp. Available http://pages.ebay.com/help/basics/f-feedback.html.

NAIMA. "Social Architecture for Networked Communities." n.d.; 7 pp. Available http://www.naima.com/.

Wulfram II. "Wulfram II Rules." n.d.; 2 pp. Available http://www.wulfram.com/rules.php.

"What's up with flat/threaded/nested comments?"; http://web.archive.org/web/20020419095447/http://slashdot.org/faq/commod.shtml; Nov. 27, 2006.

* cited by examiner

AUTOMATIC FEEDBACK AND PLAYER DENIAL

FIELD OF THE INVENTION

This invention generally relates to automatically registering and acting on feedback from an electronic community of users regarding another user, and more particularly, to enabling each user in the electronic community to provide feedback regarding a behavior of another user in the electronic community, to automatically enhance or limit the other user's participation in the electronic community.

BACKGROUND OF THE INVENTION

It is now common for users of electronic devices to electronically interact with other users and participate in group activities, including chat sessions, instant messaging, collaborative work projects, and multiplayer games. In many such applications, it is possible for users to remain anonymous while participating in groups, thereby reducing any apprehension about participating in sensitive group discussions, offering unconventional ideas, or taking other socially risky actions that the user might not otherwise take if the user's identity were known to everyone in the group. Thus, interaction with other users through such electronic communities and group sessions often enhances both an individual user's and the group's productivity, education, and entertainment.

Unfortunately, however, there is little that a community of users can do on their own to implement and enforce standards of conduct among the participants, to reward participating users for "good behavior," and penalize users perceived to exhibit "unacceptable behavior," and/or to choose the users with whom to associate. There are many systems that enable users to fill out electronic surveys about general participation in a group, to request a third party authority that is hosting the electronic group session to take action for or against another user, or to submit written feedback about another user that is used to assign a rating to that other user. The problem with such approaches is that it is very difficult to create an absolute standard of conduct or behavior that will be acceptable to all members of a community. The prior art has attempted to provide some objective approaches to deal with this issue.

For example, a feedback rating system employed by the EBAY™ online auction service enables users to submit and review feedback on trading partners. Every EBAY user has a feedback profile based on comments made by other EBAY users. Each "positive comment" is assigned one positive point, and each "negative comment" is assigned one negative point. The total number of points accumulated in this manner thereby establishes a numerical "reputation" for every EBAY user. EBAY users can review a potential trading partner's feedback profile that includes this numerical reputation, and detailed comments to determine whether to trade with that user. This approach is similar to gathering user feedback to establish a satisfaction rating, such as the number of stars (e.g., from 0 to 5) associated with a product or service, to indicate quality, sales success, customer satisfaction, or some other characteristic. For example, purchasers of a book can submit a satisfaction rating, such as four out of five stars, to the retailer from whom the book was purchased. The retailer can then average all the submissions to provide an overall satisfaction rating of the product. However, providing profiles and ratings still requires each user to decide individually whether to purchase a particular product, trade with a potential partner, or otherwise interact with another user. These systems do not automatically limit or improve the other user's participation in an electronic organization or enable a group of users as a whole to implement and enforce the groups' standards of conduct in regard to the behavior of members of the group.

Currently, to implement some action for or against a user, the third party host of the electronic group must intervene. For example, a user may submit a message to the third party host indicating that another user is violating a term of service or code of conduct established by the third party host. The third party host may then investigate, and take some action based on the investigation. However, third party intervention does not enable a group of users to take any action in an organized way as a community, for or against a user. Furthermore, it is the third party host who establishes the terms of service or code of conduct, not the members of the group. One or more users of the electronic group may send scathing emails to a target user or inundate the target user with electronic traffic in an attempt to disrupt the target user's access to the electronic group. However, these crude methods do not provide any measured sanctions by the community as a whole. Nor is there any way for the electronic group to electronically reward a target user without intervention by a third party. It would thus be desirable to enable the electronic group to maintain their own community standards for behavior, to automatically facilitate enforcement of the community standards in a measured way, and to automatically reward users for exemplary conduct relative to the community standards.

SUMMARY OF THE INVENTION

The present invention provides a method and system for automatically maintaining behavioral standards of members in an electronic community in response to feedback from the members of the electronic community. The invention enables any member of the electronic community to submit feedback regarding another specific member of the electronic community, indicating either approval or disapproval of a behavior of the specified member. As a function of the feedback provided by members of the electronic community, the method automatically determines whether a threshold associated with a behavioral standard of the electronic community is exceeded in regard to the specified member. If the threshold is exceeded, an action directed to the specified member is automatically implemented.

A preferred embodiment enables the members to submit feedback by selecting the specified member from a list of the members of the electronic community, and to select the feedback from a plurality of categories of conduct for the specified member. Preferably, feedback from any member is submitted to a central storage and processing system. The feedback in the categories of conduct are incrementally tallied in regard to the specified member, and the tally is compared to the threshold of the selected category to determine if the threshold is exceeded. If so, an action is automatically implemented, either at the central processing system in regard to the specified member's interaction with the other members of the electronic community, or by providing an indication of the action to an electronic device used by the specified member, causing the electronic device to implement the action in regard to the specified member.

Actions that can be taken as a result of exceeding the threshold include limiting communication by the specified member with other members of the electronic community; requiring the specified member to perform a specified act before allowing the specified member to participate in an activity of the electronic community; suspending the specified member from participating in the activity of the electronic community for a predetermined period; terminating access to the electronic community by the specified member; fining the specified member; banning the specified member from further use of a credit card in association with the electronic community; granting the specified member an additional privilege in the activity of the electronic community; granting the specified member a discount or a rebate; and assigning the specified member to a subgroup of the electronic community. Depending upon the nature of the electronic community and the interaction between members thereof, other sanctions or rewards may be appropriate.

Since feedback from other members is tracked to determine an action, the present invention also enables a member to choose whether to interact with another member of the electronic community, based upon the feedback that has been submitted in regard to the behavior of the other member. This feature enables a member to select a subgroup of one or more members of the electronic community with which the member will interact in an activity of the electronic community. For example, a member may wish to interact with only those members who have received a certain level of positive feedback regarding behavior in an activity of the electronic community.

The present invention further provides for automatically adjusting the threshold representing the community standard as a function of the feedback that is submitted. Thus, the present invention is sufficiently flexible for application to almost any kind of electronic community, including those involved with gaming, text communication, voice communication, video communication, electronic commerce, trading goods, trading services, collaborative work, and other electronic activities conducted over a network.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention is described below in regard to an exemplary use in an electronic gaming system that is designed to execute gaming software distributed on a portable, removable medium. Those skilled in the art will recognize that the present invention may also be implemented in a set-top box, in an arcade game, in a handheld device, in a personal computer (PC), and in other systems in which there is a desire to register complaints about other participants and to deny access to participants that exceed a community's standards. It should also be apparent that the present invention may be practiced on a single such machine, but is preferably practiced in a network environment, with multiple consoles or computing devices interconnected with one or more server computers.

Exemplary System

Figure 1:
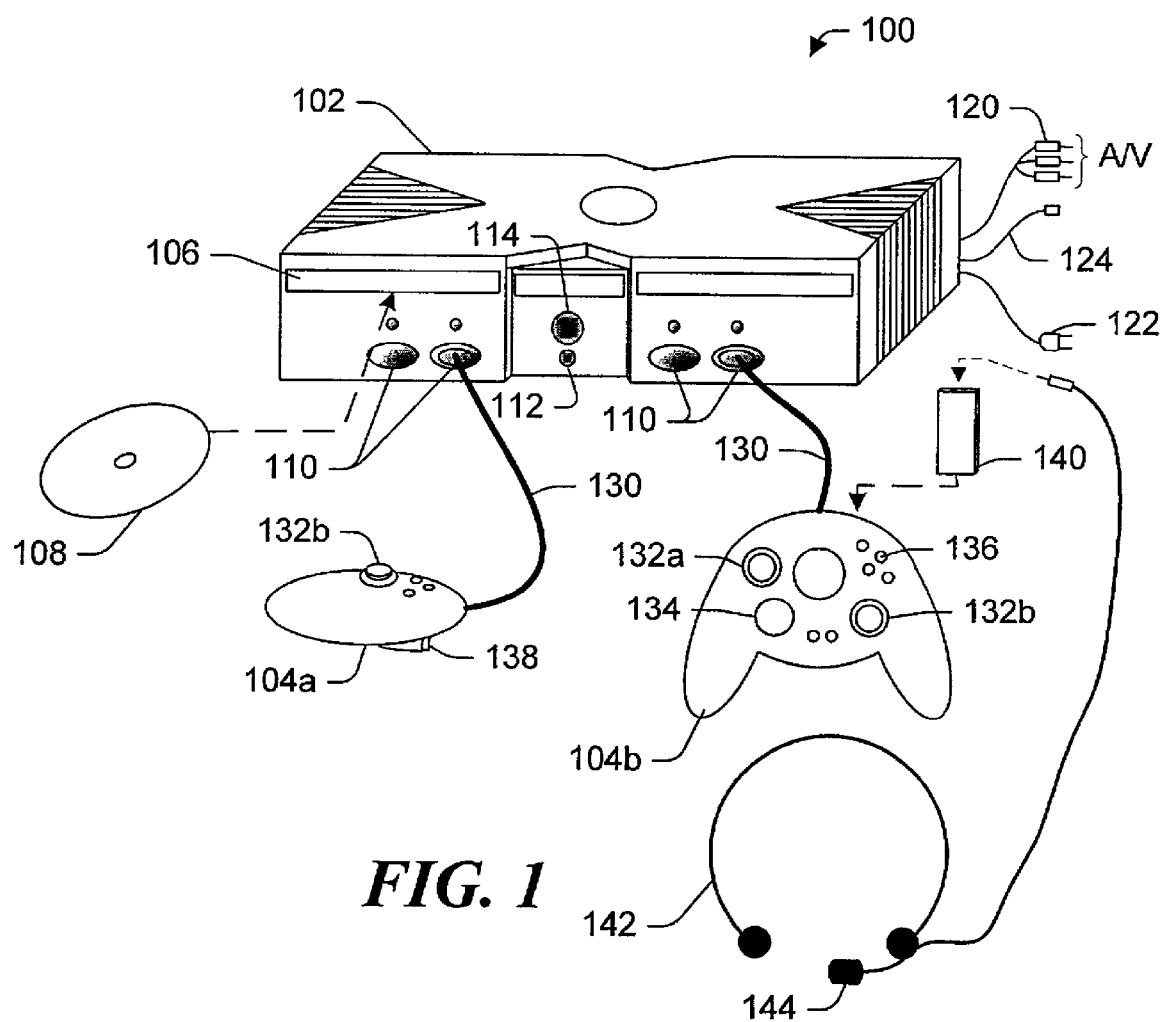
FIG. 1 illustrates an exemplary electronic gaming system that includes a game console and support for up to four user input devices.

As shown in FIG. 1, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media include DVD discs and CD-ROM discs. In this gaming system, game programs are preferably distributed for use with the game console on DVD discs, but it is also contemplated that other storage media might instead be used on this or other types of systems that employ the present invention.

On a front face of game console 102 are four slots 110 for connection to supported controllers, although the number and arrangement of slots may be modified. A power button 112, and an eject button 114 are also positioned on the front face of game console 102. Power button 112 controls application of electrical power to the game console, and eject button 114 alternately opens and closes a tray (not shown) of portable media drive 106 to enable insertion and extraction of storage disc 108, so that the digital data on it can be read for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 includes an Ethernet data connector 124 to transfer and receive data over a network (e.g., through a connection to a hub or a switch—not shown), or over the Internet, for example, through a connection to an xDSL interface, a cable modem, or other broadband interface (not shown). Other types of game consoles may be coupled together in communication using a conventional telephone modem.

Each controller 104a and 104b is coupled to game console 102 via a lead (or alternatively through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 1, each controller 104a and 104b is equipped with two thumbsticks 132a and 132b, a D-pad 134, buttons 136, and two triggers 138. These controllers are merely representative, and other gaming input and control devices may be substituted for or added to those shown in FIG. 1 for use with game console 102.

A removable function unit 140 can optionally be inserted into controller 104 to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. In the described implementation, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from MU 140. For example, gaming system 100 is potentially capable of playing:

Game titles stored on CD and DVD discs, on the hard disk drive, or downloaded from an online source;

Digital music stored on a CD in portable media drive 106, in a file on the hard disk drive (e.g., Windows Media Audio™ (WMA) format), or derived from online streaming sources on the Internet or other network; and Digital AV data stored on a DVD disc in portable media drive 106, or in a file on the hard disk drive (e.g., in an Active Streaming Format), or from online streaming sources on the Internet or other network.

Figure 2:
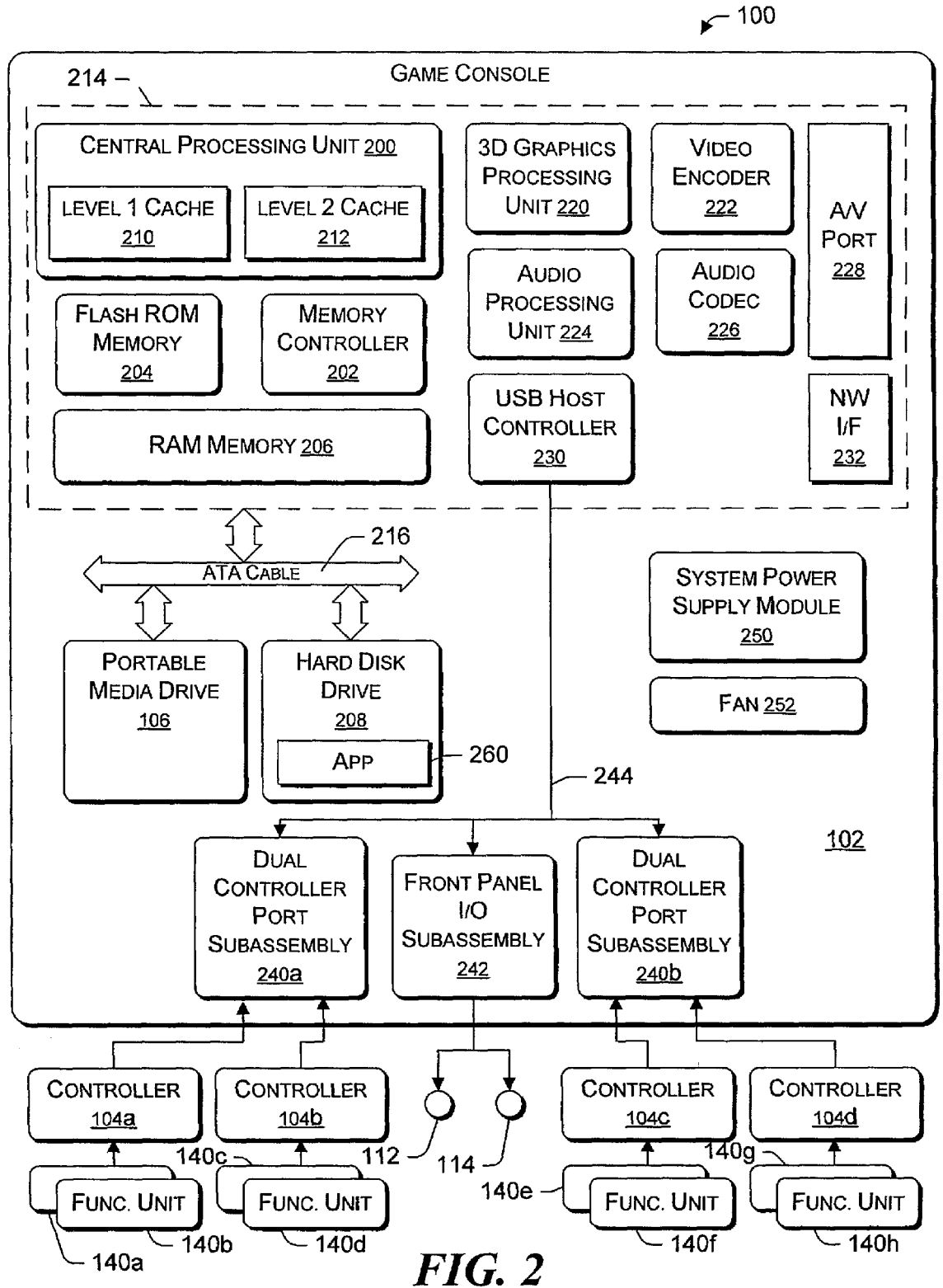
FIG. 2 is a functional block diagram showing components of the gaming system in greater detail.

FIG. 2 shows functional components of gaming system 100 in greater detail. Game console 102 includes a central processing unit (CPU) 200, and a memory controller 202 that facilitate processor access to a read-only memory (ROM) 204, a random access memory (RAM) 206, a hard disk drive 208, and portable media drive 106. CPU 200 is equipped with a level 1 cache 210 and a level 2 cache 212 to temporarily store data so as to reduce the number of memory access cycles required, thereby improving processing speed and throughput. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As an example of one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAMs (DDR SDRAMs) that are independently controlled by memory controller 202 via separate buses (not shown). Hard disk drive 208 and portable media drive 106 are connected to the memory controller via the PCI bus and an Advanced Technology Attachment (ATA) bus 216.

A three-dimensional 3D graphics processing unit (GPU) 220 and a video encoder 222 form a video processing pipeline for high-speed and high-resolution graphics processing. Data are carried from graphics processing unit 220 to video encoder 222 via a digital video bus (not shown). An audio processing unit 224 and an audio encoder/decoder (CODEC) 226 form a corresponding audio processing pipeline for high fidelity and stereo audio data processing. Audio data are carried between audio processing unit 224 and audio CODEC 226 via a communication link (not shown). The video and audio processing pipelines output data to an A/V port 228 for transmission to the television or other display monitor. In the illustrated implementation, video and audio processing components 220-228 are mounted on module 214.

Also implemented by module 214 are a USB host controller 230 and a network interface 232. USB host controller 230 is coupled to CPU 200 and memory controller 202 via a bus (e.g., the PCI bus), and serves as a host for peripheral controllers 104a-104d. Network interface 232 provides access to a network (e.g., the Internet, home network, etc.) and may be any of a wide variety of various wire or wireless interface components, including an Ethernet card, a telephone modem interface, a Bluetooth module, a cable modem interface, an xDSL interface, and the like.

Game console 102 has two dual controller support subassemblies 240a and 240b, with each subassembly supporting two game controllers 104a-104d. A front panel input/output (I/O) subassembly 242 supports the functionality of power button 112 and eject button 114, as well as any light-emitting diodes (LEDs) or other indicators exposed on the outer surface of the game console. Subassemblies 240a, 240b, and 242 are coupled to module 214 via one or more cable assemblies 244.

Eight function units 140a-140h are illustrated as being connectable to four controllers 104a-104d, i.e., two function units for each controller. Each function unit 140 offers additional functionality or storage on which games, game parameters, and other data may be stored. When an MU is inserted into a controller, the MU can be accessed by memory controller 202.

A system power supply module 250 provides power to the components of gaming system 100. A fan 252 cools the components and circuitry within game console 102.

To implement the present invention, a game software application 260 comprising machine instructions stored on a DVD or other storage media (or downloaded over the network) is loaded into RAM 206 and/or caches 210, 212 for execution by CPU 200. Portions of software application 260 may be loaded into RAM only when needed, or all of the software application (depending on its size) may be loaded into RAM 206. Software application 260 is described below in greater detail.

Gaming system 100 may be operated as a stand-alone system by simply connecting the system to a television or other display monitor. In this standalone mode, gaming system 100 enables one or more users to play games, watch movies, or listen to music. However, with connectivity to the Internet or other network, which is made available through network interface 232, gaming system 100 may be further operated as a component of a larger network gaming community, to enable online multiplayer interaction in games that are played over the Internet or other network with players using other gaming systems.

Network System

Figure 3:
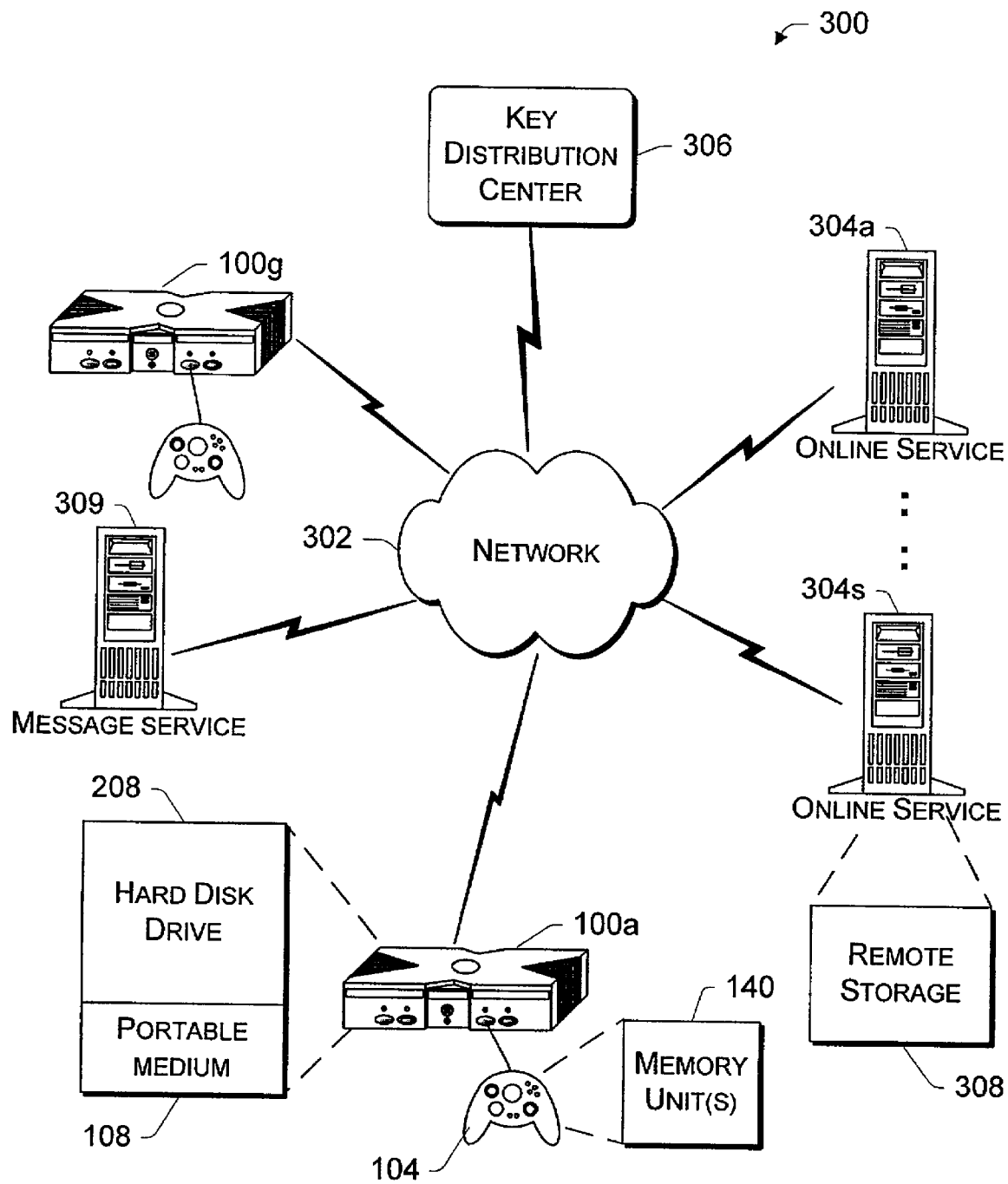
FIG. 3 shows an exemplary network gaming environment that interconnects multiple gaming systems via a network.

FIG. 3 shows an exemplary network gaming environment 300 that interconnects multiple gaming systems 100a, . . . 100n via a network 302. Network 302 represents any of a wide variety of data communications networks and may include public portions (e.g., the Internet), as well as private portions (e.g., a residential Local Area Network (LAN)).

Network 302 may be implemented using any one or more of a wide variety of conventional communications configurations including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304a, . . . 304s are accessible via network 302 to provide various services for the participants, such as serving and/or hosting online games, serving downloadable music or video files, hosting gaming competitions, serving streaming A/V files, and the like. Network gaming environment 300 may further employ a key distribution center 306 that plays a role in authenticating individual players and/or gaming systems 100 for interconnection to one another as well as to online services 304a, . . . 304s. Distribution center 306 distributes keys and service tickets to valid participants that may then be used to form game playing groups including multiple players, or to purchase services from online services 304a, . . . 304s.

Network gaming environment 300 introduces another memory source available to individual gaming systems 100, i.e., online storage. In addition to optical storage disc 108, hard disk drive 208, and MU(s), gaming system 100a can also access data files available at remote storage locations via network 302, as exemplified by remote storage 308 at online service 304s. Network gaming environment 300 further includes a message service 309 providing functionality needed to deliver messages between the gaming systems, between the online services and the gaming systems, and between other devices within, and outside of Network gaming environment 300.

Figure 4:
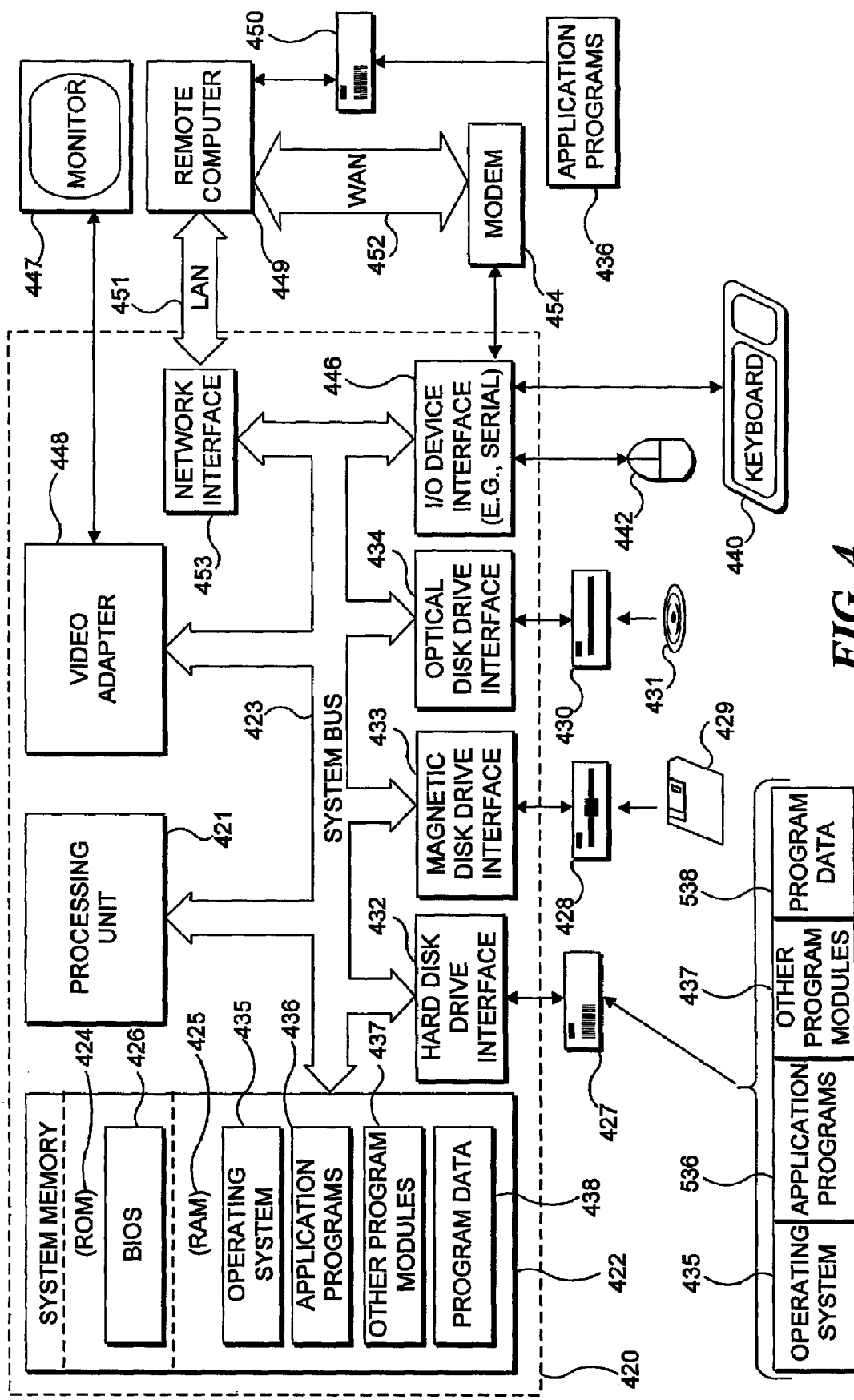
FIG. 4 is a functional block diagram of a general purpose computing device in the form of a conventional server computer for use in an exemplary system for online services.

With reference to FIG. 4, an exemplary system for online services 304a, . . . 304s in accord with the present invention includes a general purpose computing device in the form of a conventional server computer (SC) 420, provided with a processing unit 421, a system memory 422, and a system bus 423. The system bus couples various system components including the system memory to processing unit 421 and may be any of several types of bus structures, including a memory bus or memory controller, a peripheral bus, and a local bus using any of a variety of bus architectures. The system memory includes ROM 424 and RAM 425. A basic input/output system 426 (BIOS), containing the basic routines that help to transfer information between elements within SC 420, such as during start up, is stored in ROM 424. SC 420 further includes a hard disk drive 427 for reading from and writing to a hard disk (not shown), a magnetic disk drive 428 for reading from or writing to a removable magnetic disk 429, and an optical disc drive 430 for reading from or writing to a removable optical disc 431, such as a CD-ROM or other optical media. Hard disk drive 427, magnetic disk drive 428, and optical disc drive 430 are connected to system bus 423 by a hard disk drive interface 432, a magnetic disk drive interface 433, and an optical disc drive interface 434, respectively. The drives and their associated computer readable media provide nonvolatile storage of computer readable machine instructions, data structures, program modules, and other data for SC 420. Although the exemplary environment described herein employs a hard disk, removable magnetic disk 429, and removable optical disc 431, it will be appreciated by those skilled in the art that other types of computer readable media, which can store data and machine instructions that are accessible by a computer, such as magnetic cassettes, flash memory cards, digital video discs (DVDs), Bernoulli cartridges, RAMs, ROMs, and the like, may also be used in the exemplary operating environment.

A number of program modules may be stored on the hard disk, magnetic disk 429, optical disc 431, ROM 424, or RAM 425, including an operating system 435, one or more application programs 436, other program modules 437, and program data 438. A user may enter commands and information into SC 420, and provide control input through input devices such as a keyboard 440 and a pointing device 442. Pointing device 442 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other I/O devices are often connected to processing unit 421 through an I/O interface 446 that is coupled to the system bus 423. The term I/O interface is intended to encompass each interface specifically used for a serial port, a parallel port, a game port, a keyboard port, and/or a USB. A monitor 447 or other type of display device is also connected to system bus 423 via an appropriate interface, such as a video adapter 448, and is usable to display application programs, graphic images, Web pages, and/or other information. In addition to the monitor, SCs may be coupled to other peripheral output devices (not shown), such as speakers (through a sound card or other audio interface—not shown) and printers.

SC 420 preferably operates in a networked environment using logical connections to one or more remote computers or computing devices, such as a remote computer 449. Remote computer 449 may be another SC, a game console, a personal computer (which is typically generally configured much like SC 420), a router, a network PC, a peer device, or a satellite or other common network node, and typically includes many or all of the elements described above in connection with SC 420, although only an external memory storage device 450 has been illustrated in FIG. 4. As also described above with regard to network 302 of FIG. 3, the logical connections depicted in FIG. 4 include a local area network (LAN) 451 and a wide area network (WAN) 452. Such networking environments are now relatively common in homes, and very common in offices, enterprise wide computer networks, intranets, and the Internet.

For use in a LAN networking environment, SC 420 is connected to LAN 451 through a network interface or adapter 453. When used in a WAN networking environment, SC 420 typically includes a modem 454, or other means such as a cable modem, DSL interface, or an Integrated Service Digital Network (ISDN) interface for establishing communications over WAN 452, such as the Internet. Modem 454, which may be internal or external, is connected to the system bus 423 or coupled to the bus via I/O device interface 446; i.e., through a serial port. In a networked environment, program modules depicted relative to SC 420, or portions thereof, may be stored in the remote memory storage device. It will be appreciated that the network connections shown are exemplary and other means of establishing a communications link between the computers/computing devices may be used, such as wireless communication and wide band network links. Those skilled in the art will also appreciate that SC 420 maybe used as a gaming console.

Exemplary Method

For exemplary purposes, the following describes a preferred embodiment of the present invention, which enables players of an electronic game to maintain community standards through the automated actions performed by a central game server in response to feedback from the players supplied using game consoles that are connected over a network to the central game server. Players participating in a game session preferably provide feedback regarding other players during a current game session or after a recently completed game session. Those skilled in the art will recognize that other embodiments may include maintaining community standards of conduct among members of text, voice, or video chat sessions, traders in electronic commerce, or among members of other forms of electronic communities.

Figure 5:
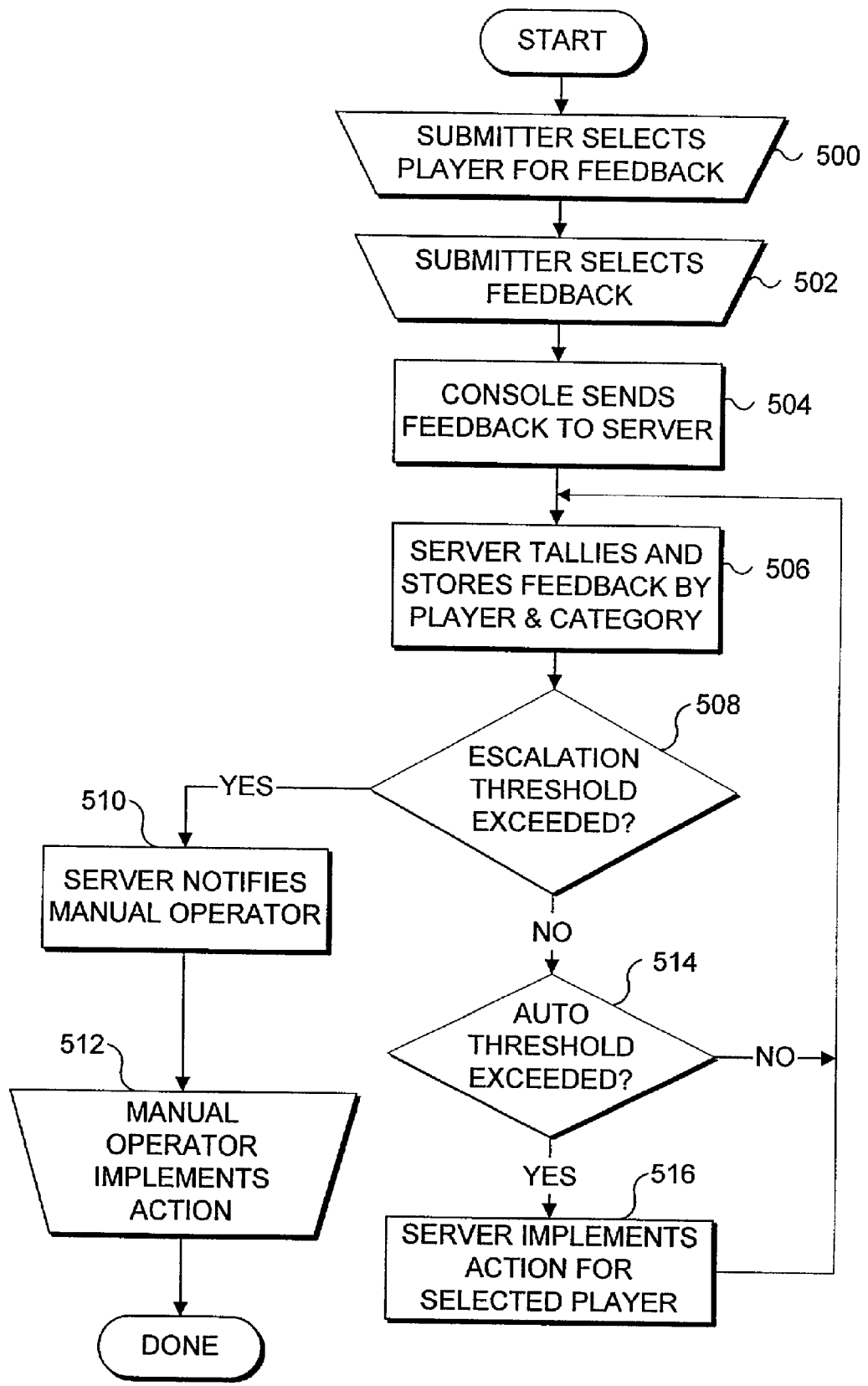
FIG. 5 is a flow diagram showing the logic for maintaining behavior standards of an exemplary electronic community of game players.

FIG. 5 generally illustrates the logic for maintaining behavioral standards of an exemplary electronic community of game players. At a step 500, a player participating in the game session, referred to as a submitter, selects an identification (such as an alias) of another player who is also participating in the game session. The submitter may select the other player from a list of cached players participating in the same game session. Those skilled in the art will recognize that the submitter may alternatively select from a list of all players, a list of players recently encountered, or from any other form listing a collection of players that comprise the player community. The submitter may select a player via a dashboard menu option, a feedback button, or other means provided within the operating system of the game console or within a game.

After selecting a player, the submitter selects an appropriate feedback directed to that player at a step 502. A variety of feedback selections can be provided and may include both complaints and compliments. The net effect of a plurality of such complaints or compliments may have a short-term or long-term effect on the selected player's participation in a current and/or future game session. Aggregate feedback directed to the selected player may also affect the selected player's standing in the community of game players. For example, the aggregate feedback may determine the selected player's eligibility to participate in the game with other players having a certain skill level, level of courteousness, and/or other criteria.

Once the submitter has selected what the submitter perceives as an appropriate feedback directed to the selected player, the submitter's game console sends the feedback and the selected player identification (ID) over the network to the central game server, at a step 504. (Hereinafter, the central game server will be referred to simply as "the server.") At a step 506, the server tallies and stores the feedback by player and feedback category. At a decision step 508, the server determines whether the collected feedback for the selected player has exceeded an escalation threshold for the category of feedback provided by the submitter. The escalation threshold represents a level of feedback at which decision-making authority is escalated, preferably to one or more human beings. The escalation threshold can be defined in a number of different ways to reflect a concern by the community of players regarding the behavior of other players. In this preferred embodiment, each different threshold is defined simply as a top x percentage of all players who have received complaints in a given category, and the escalation threshold will normally be the highest top percent of complaints in the category, and would typically only be achieved after lower thresholds had been exceeded, each lower threshold resulting in an automated action being taken by the server.

When the gaming service first starts up, there may be a period of time before any actions are taken, to provide time for numbers of complaints to be tallied. As more players use the gaming service, it may be appropriate to adjust these thresholds. As a further aspect, it is possible that the community of gaming members might vote on the thresholds and the appropriate actions to be taken when each specific threshold is exceeded. Clearly, there are many small refinements and variations that might be applied in regard to carrying out the present invention, and certain actions related to behavior that might be appropriate for one electronic community might be inappropriate for another type of electronic community.

Those skilled in the art will recognize that a variety of other functions may be utilized to establish and update the threshold. If the escalation threshold is exceeded for a player, the server preferably escalates the issue to a manual operator, at a step 510. At a step 512, the manual operator and/or a group of people may evaluate the feedback and implement an agreed upon action. For feedback comprising complaints, the sanction resulting from such an escalation will typically be much harsher than the automated action taken in response to lower levels of feedback. Those skilled in the art will recognize that such evaluation and action may also be performed automatically by the server rather than manually. It is contemplated that the thresholds may be updated, feedback may be evaluated, and actions may be taken, on a continuous dynamic basis, or at scheduled intervals, or at other times. For example, all feedback may be tallied over a predefined interval, such as twice a week, after which, a batch process can be applied to evaluate each player's tally of feedback for each category to determine if any action(s) should be taken regarding the player.

If the feedback regarding the selected player and the selected category of feedback has not exceeded the escalation threshold, the server determines, at a decision step 514, whether the tallied feedback exceeds an auto threshold for automatic response. The auto threshold is preferably established as a somewhat lower top percentage of players who have had feedback from other players logged relative to them or can be based on some other function. If the auto threshold is exceeded, the server implements a predetermined action for the selected player, at a step 516.

Preferably, the server implements the action in step 516 through a general messaging service (GMS). The GMS preferably comprises a series of GMS servers that are employed to deliver messages to users of the game service. The GMS interacts with the game server to obtain information regarding a predetermined action to be taken for a selected player and delivers one or more messages to the selected player's game console. The messages include information regarding the predetermined action, and the information may enable or disable features of the game console or game software. Upon user login, or at other times, the game console checks for messages from the GMS, notifies the user that messages are pending, and gives the user an opportunity to read these messages. Certain messages are required, and the user is forced to read them before proceeding with any other functions of the game console. Some messages include information that provides functionality to the user. For example, a message may include code that alerts a user to update credit card data to enable charges to continue for participation on the game service (e.g., in response to receipt of a message advising of a credit card expiration). Also, a message may include code that enables a user to change a name or alias used (e.g., in the event of a forced name change message). Alternatively, the message may simply notify the user of an action implemented on the game server. For instance, if a user receives a message with a notice that the user's participation in the game service has been "suspended," the user will understand why he/she cannot login to the game service.

A message may also affect functions of the game console. For example, a player using excessive profanity during game voice communications may be informed by a message displayed on the gaming system that voice communication by the player during game play will be precluded for three weeks (or some other period of time). To enforce this action, data preventing the player from engaging in voice communications with other players will be sent to the player's game console by the server each time the player registers with the server to play a game using the game service, until the time period of the voice communication banning action expires.

After the action is implemented, or if the auto threshold is not exceeded, control returns to step 506 to await additional feedback regarding the selected player. The threshold may be updated, the feedback may be evaluated, and actions may be taken at scheduled intervals, or at other times, rather than immediately upon receipt of feedback.

Figure 6:
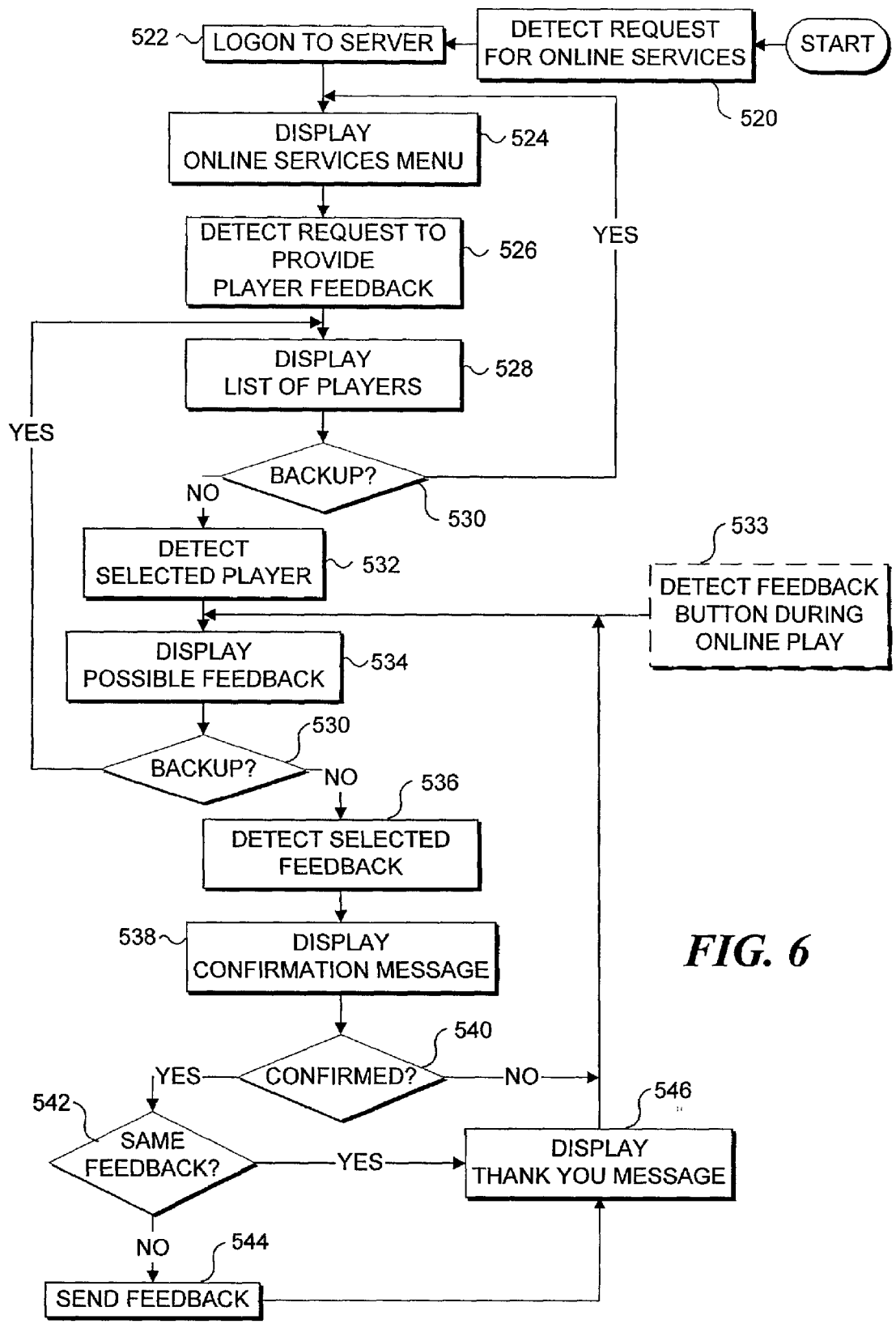
FIG. 6 is a flow diagram illustrating the logic used by a game console to enable a submitter to provide feedback regarding another player.

FIG. 6 is a flow diagram illustrating logic used by a game console to enable a submitter to provide feedback regarding another player. At a step 520, the console detects a request from the submitter for online services, such as registering feedback. Although the invention may be practiced on a single machine, feedback is preferably provided over a network to the server, even when the feedback is directed to a player who is playing the game on the same console as the submitter providing the feedback. It is also contemplated that local feedback processing may occur on the console, which may be nested within larger and larger network communities. In this exemplary preferred embodiment, a submitter's request to provide feedback via online services triggers the console to logon to the server at a step 522, if not already logged on. The submitter's request to provide feedback via online services may be triggered by pressing a button, selecting a menu option, or other common user input techniques.

At a step 524, the console displays an online services menu. Online services may include initiating an online game, downloading information, and other activities, in addition to providing player feedback. At a step 526, the console detects the submitter's request to provide player feedback. The console then displays a list of prospective players for which the submitter may provide feedback, at a step 528. As indicated above, the list of players may be only those players currently engaged in a game session with the submitter, may be a list of all players who have played the game with the submitter, or may be a list defining another community of players.

As illustrated by a decision step 530, the submitter may choose to return to a previous step in the process by selecting a backup function. If the submitter chooses the backup function at this point in the feedback process, control returns to step 524 to display all of the online services available to the submitter. If the submitter does not backup to the previous step, the submitter may select a player for whom to provide feedback from the displayed list of players. The console detects the selected player at a step 532. Alternatively, during online play, the submitter may optionally first select a player from a list of players, and then choose to initiate feedback by pressing a feedback button. The console detects this feedback button press during online play at a step 533.

Notwithstanding the order in which a player is selected and feedback is initiated, the console displays a variety of feedback categories at a step 534. Categories may included "screaming" over a voice channel, making unsolicited offers over a voice or chat channel (i.e., spamming), using abusive, lewd, or profane language, cheating in the game, playing extremely poorly (e.g., as a rank beginner in a game session designated for expert players), using a nickname or account name that is unacceptable among the community, or otherwise engaging in conduct that is considered unacceptable to the community of players. Positive forms of feedback include playing a game extremely well, displaying a good attitude toward the game and other players, and engaging in other conduct that is encouraged by the community of players. It is contemplated that the submitter may also choose to provide written information in support of the feedback, rather than merely selecting from the list of predetermined feedback categories.

If the submitter decides not to provide any feedback, the submitter may backup to a previous display via another instance of decision step 530. When the submitter chooses to enter feedback, the console detects the selected feedback at a step 536. At a step 538, the console displays a confirmation message that preferably describes any effect that the feedback might have on the selected player. The message also preferably includes a standard set of buttons enabling the submitter to confirm submission of the feedback or cancel submission of the feedback. At a decision step 540, the console determines whether the submitter elected to confirm submission of the feedback. If the submission was not confirmed, control returns to step 534 to display the available feedback categories.

Once the submitter confirms submission of the feedback, the console determines, at a decision step 542, whether the same feedback was previously submitted by the same submitter regarding the same player. This check is performed to prevent a submitter from entering excessive feedback of the same type regarding the same player. Preferably, the submitter may submit a category of feedback only once with regard to a particular player. The submitter may submit other categories of feedback regarding the same player, but the submitter is prevented from submitting feedback in the same category multiple times regarding the same player. Those skilled in the art will recognize that the logic can be easily modified to enable a predetermined number of submissions or unlimited number of submissions by a submitter in the same category and in regard to the same player. If the submitter has not submitted the same feedback regarding the same player, the console sends the feedback to the server, at a step 544. Once the feedback is sent, or if the feedback is prevented from being sent, the console displays a message, at a step 546, thanking the submitter for the submitter's feedback. Control then returns to step 534 to display the possible feedback categories, enabling the submitter to enter additional feedback or back out of the feedback menu system.

Figure 7:
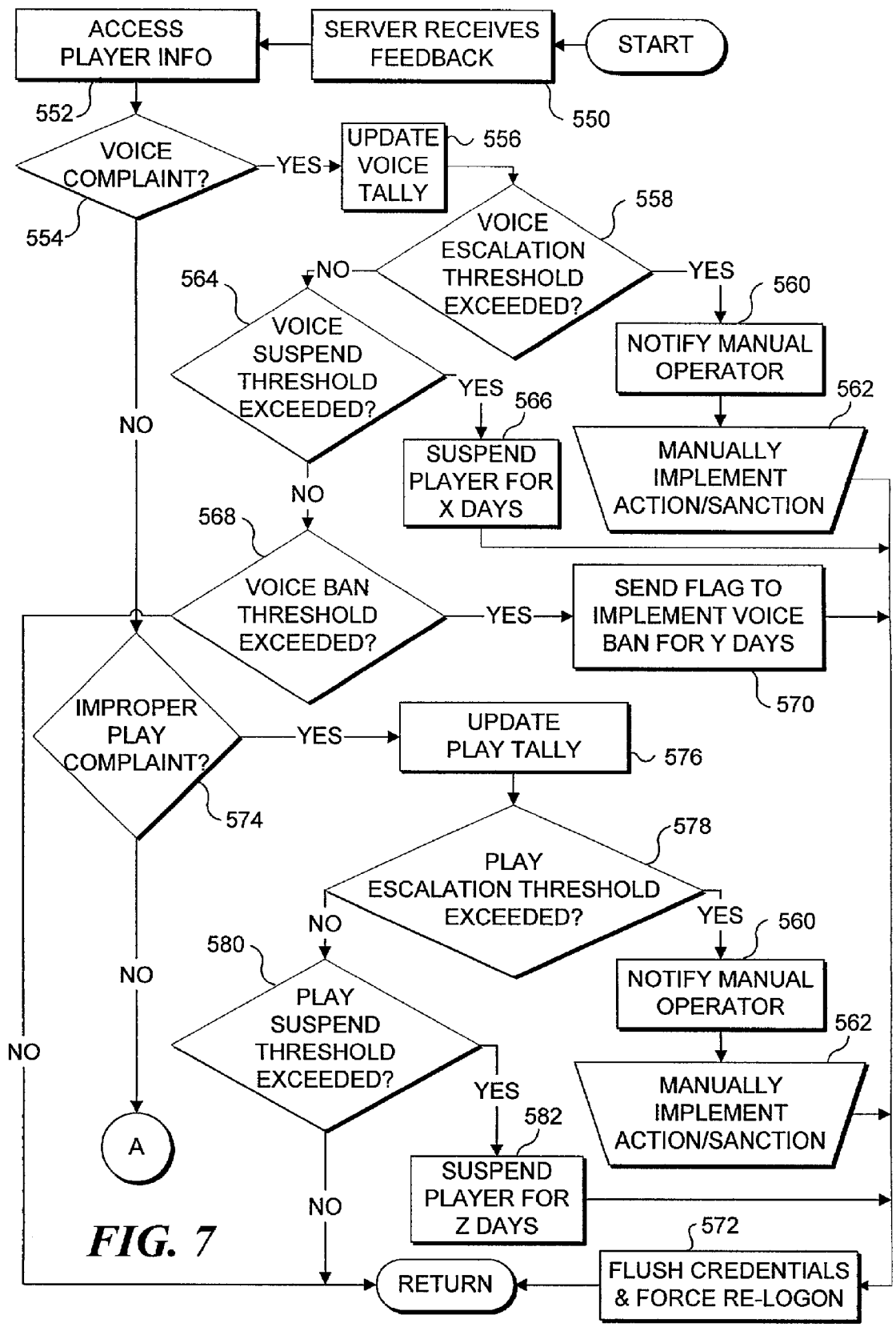
FIG. 7 is a flow diagram illustrating the logic used by a server to process feedback from the submitter through the game console.

FIG. 7 is a flow diagram illustrating logic used by a server to process feedback from the game console. The logic is generally organized by feedback category. At a step 550, the server receives feedback from the console. Preferably, the server receives an identifier of the submitter, an identifier of the selected player to which the feedback applies, a nickname (if any) of the player to which the feedback applies, a session identifier, a date, and/or other pertinent data. Using the player identifier, the server accesses information stored about the selected player, at a step 552. The selected player's information preferably includes any feedback previously submitted regarding the selected player.

At a decision step 554, the server determines whether the received feedback is a voice (communication) complaint. As suggested above, a voice complaint may reflect disapproval of screaming over a voice channel, making unsolicited offers to sell something over a voice or chat channel (i.e., spamming), using abusive, lewd, or profane language, issuing threats, harassing other players, or otherwise using a communication channel in a manner disapproved by the submitter. If the received feedback is a voice complaint, the server updates a tally of voice complaints at a step 556. Preferably, the tally tracks both the number of complaints submitted and the dates that the complaints were submitted. Based on the date information, the server can delete complaints that are older than a predefined period, such as six months. In this way, a moving window of complaints submitted by others is tracked regarding the selected player. Older complaints that were submitted relative to a selected player, prior to the oldest date included in the moving window, are no longer considered.

It is also contemplated that the tally may be adjusted as a function of a credential of the submitter. The submitted feedback may include the credential identifying the submitter as a trusted submitter, neutral submitter, an untrusted submitter, a patrol officer submitter, a super user submitter, or other type of submitter. Each type of submitter may have a different affect on the adjustment of the tally. For example, feedback from a trusted submitter may increase the tally to a greater degree than feedback from a neutral submitter. A trusted submitter may have earned the credential based on positive feedback from other members of the electronic community. Alternatively, the trusted submitter may have been elected to the receive the credential by the other members of the electronic community. There are clearly many other methods for associating a credential with a member of the electronic community. Conversely, feedback from an untrusted submitter may have less effect on the tally than feedback from a neutral submitter. Similarly, feedback from a super user submitter may cause the tally to be immediately set beyond a threshold. For multiple thresholds, it is contemplated that the feedback may include a threshold level that the super user submitter wishes to exceed. Providing a credential to submitters enables the electronic community to associate levels of credibility and influence with certain members of the electronic community, based upon the perceptions of the community regarding those members, as is often the case in other communities.

After storing the updated tally, the server may simply await further feedback if threshold evaluations are done at predefined intervals, such as every two weeks. However, if the server is set to perform threshold evaluations immediately, the server determines whether the tally of voice complaints exceeds a voice escalation threshold that warrants intervention by one or more person, as shown at a decision step 558. The voice escalation threshold, and each other threshold discussed below, reflects a standard of the electronic community. Preferably, the voice escalation threshold is a function of all voice complaints received about all players. For example, the voice escalation threshold may correspond to a top percentage of players who have had voice complaints registered against them. This top percentage can be set as a function of the total number of voice complaints submitted for all players. If the selected player's tally of voice complaints puts the selected player into the top percentage of players against whom voice complaints have been lodged, the voice escalation threshold is exceeded. Again, before the escalation threshold is exceeded, a lower threshold to which the server automatically applies an action will have been exceeded. Those skilled in the art will recognize that threshold levels may be defined by other functions, and based on other parameters, including a total number of players, a number of complaints in one or more categories, an average number of complaints, a number of compliments offsetting a number of complaints, etc. Thus, threshold levels can be automatically adjusted as more feedback is submitted, as the number of players changes, or as other factors vary.

Returning to the specific case of voice complaints, if the voice escalation threshold is exceeded, the server notifies a manual operator, at a step 560. At a step 562, one or more people may determine and implement a sanction or other action. For example, a committee of moderates that represent the community of players may implement a sanction deemed appropriate for the tally of voice complaints. Preferably, manual intervention only occurs in extreme cases, such as when an extremely high percentage (or number) of voice complaints have been submitted about a specific player. Further detail regarding manual intervention is described below with regard to FIG. 10. Those skilled in the art will recognize that an embodiment of the invention need not include any manual intervention and can alternatively be completely automated. However, it is preferable to reserve a capability of manual intervention for extreme or unusual situations, such as permanently banning a specific player from any further voice communication during game play.

If the tally of voice complaints does not exceed the voice escalation threshold, the server determines, at a decision step 564, whether the tally of voice complaints exceeds a voice suspend threshold. Preferably, the voice suspend threshold is lower than the voice escalation threshold, so that the suspend threshold is exceeded by a lower percentage of users against whom voice complaints have been registered. If the tally of voice complaints exceeds the voice suspend threshold (but is lower than the voice escalation threshold), the server automatically suspends the selected player from online game play for a predetermined number of days (or weeks), at a step 566, but does not terminate the player's online account or other privileges. In other circumstances, such as electronic commerce, a sanction may include automatically suspending the selected member from trading with others in the electronic community for a predetermined period. Suspension periods may be varied to any desired level, such as minutes, hours, weeks, months, etc.

If the tally of voice complaints does not exceed the voice suspend threshold, the server determines, at a decision step 568, whether the tally of voice complaints exceeds a voice ban threshold. If the tally of voice complaints exceeds the voice ban threshold (but is less than the voice suspend threshold), the server automatically sends a flag to the console, at a step 570, causing the console to ban the player from using the voice communications during the current game play and for a predetermined number of days (or other time period). Preferably, application programming interfaces (APIs) are built into game software executed on the console, and the APIs respond to the flag to prevent the selected player from transmitting over the voice channel. In the case of a voice ban, the player may continue to participate in any games, but is banned from verbally communicating with other players over the voice channel. This is the lowest sanction resulting from voice complaints. One of skill in the art will recognize that other levels or types of actions may be implemented, such as issuing a warning to the selected player, fining the selected player, attenuating verbal communications from the selected player, etc.

If any of the above sanctions are implemented, the player is temporarily disconnected from the online service (i.e., the participation of the player in the current game session is terminated), at a step 572, forcing that player to logon to the gaming service again. Disconnecting the player from the service also includes flushing all cached credentials for the player, and forcing the player to obtain new game tickets. The new tickets will enable the server to enforce the implemented sanction. Enforcement preferably includes the use of the GMS to display an appropriate message as a result of a flag sent by the server to the selected player's console. If the tally of voice complaints does not exceed any of the above thresholds, control simply returns to a calling module with the effect of simply incrementing the tally of voice complaints against the selected player that are stored by the server.

If the received feedback was not a voice complaint, the server determines, at a decision step 574, whether the received feedback is a complaint regarding improper play. An improper play complaint concerns the selected player's conduct in playing the game. Unacceptable conduct may include cheating, playing so poorly as to be considered not trying, intentionally "throwing" the game, interfering with another player, and/or otherwise playing in a manner that is perceived as unacceptable to the submitter. If the received feedback is an improper play complaint, the server updates a tally of play complaints at a step 576, assuming that the submitter has not previously submitted a complaint about this player in this category. At a decision step 578, the server determines whether the tally of play complaints exceeds a play escalation threshold that warrants intervention by one or more human beings. If the tally of play complaints exceeds the play escalation threshold, which will typically have occurred only after the automated actions discussed below have been implemented, the server notifies the manual operator at step 560. As described above, one or more people may determine and implement a sanction or other action, at step 562. In this case, a game referee may implement a sanction deemed appropriate for the tally of play complaints.

If the tally of play complaints does not exceed the play escalation threshold, the server determines, at a decision step 580, whether the tally of play complaints exceeds a play suspend threshold. Preferably, the play suspend threshold is less than the play escalation threshold. If the tally of voice complaints exceeds the play suspend threshold (but is less than the play escalation threshold), the server automatically suspends the selected player from playing games for a predetermined number of days, at a step 582. As indicated above, the suspension preferably prevents the player from playing games online for the predetermined number of days, but does not terminate the player's online account or other permanent privileges. The suspension period may be the same as, or different than, the suspension period imposed for voice complaints.

As with voice complaints, if any of the above improper play sanctions are implemented, the player is temporarily disconnected from the online service, at step 572, flushing all cached credentials for the player, forcing that player to logon again, and forcing the player to obtain new game tickets. Alternatively, if the tally of improper play complaints does not exceed any of the above thresholds, control simply returns to the calling module with the effect of simply incrementing the tally of improper play complaints against the selected player that are stored by the server. If the server determines that the received feedback was not an improper play complaint, control passes via a connector A to the continued logic of FIG. 8.

Figure 8:
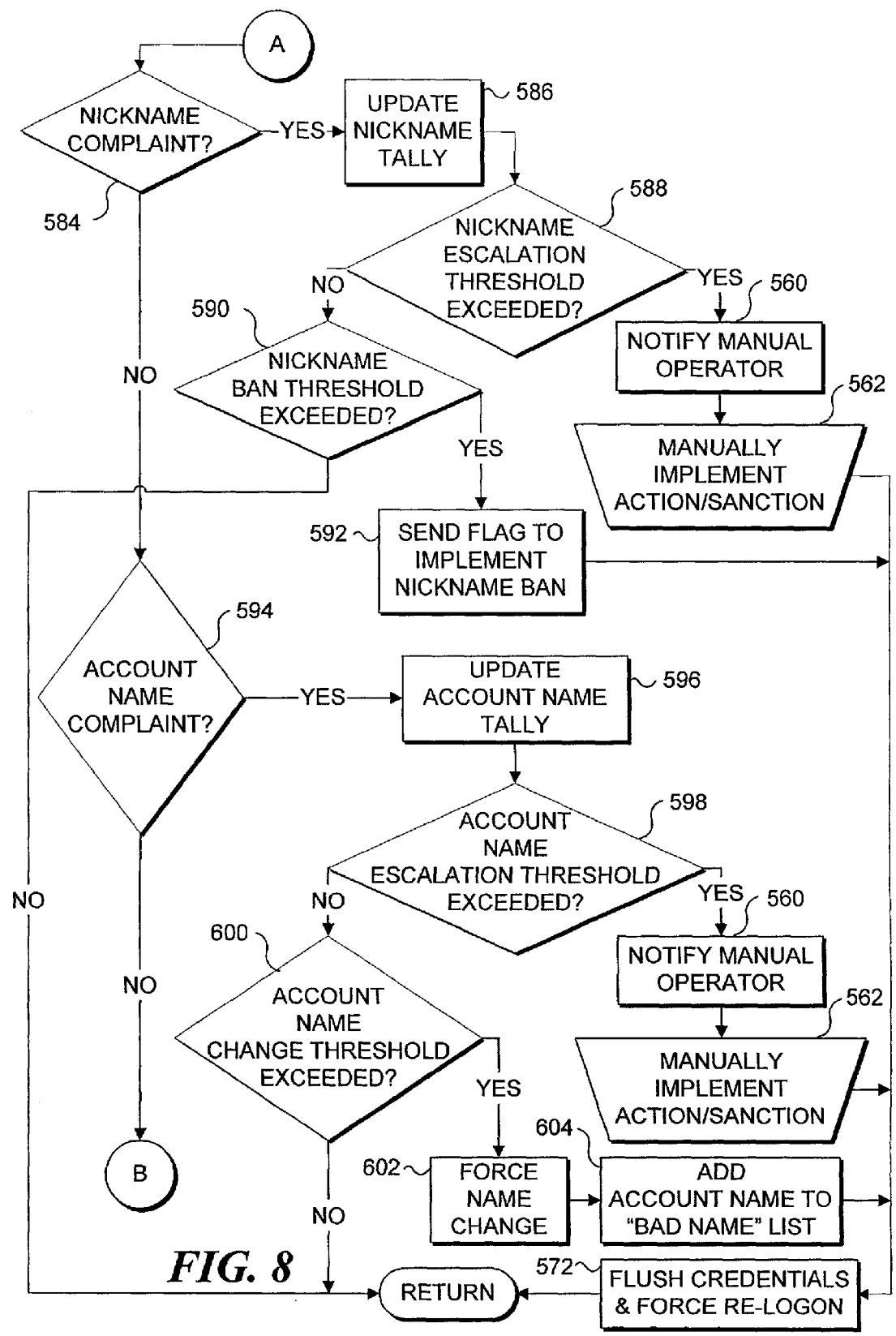
FIG. 8 is a flow diagram illustrating the logic used by the server to process negative feedback from the game console.

FIG. 8 illustrates the logic used by the server to process negative feedback from the game console regarding other categories. At a decision step 584, the server determines whether the received feedback is a nickname complaint. A nickname complaint reflects disapproval of an electronic nickname being used by the selected player in the game. A nickname may be used by a player to remain anonymous during communication with the electronic community; however, a nickname may be perceived as lewd, profane, or otherwise unacceptable to the submitter. In the circumstance of electronic commerce, a nickname complaint may reflect improper use of another's trade name. If the received feedback is a nickname complaint, the server updates a tally of nickname complaints at a step 586. At a decision step 588, the server determines whether the tally of nickname complaints exceeds a nickname escalation threshold. If the tally of nickname complaints exceeds the nickname escalation threshold, which will normally not occur until after the automated actions discussed below have been applied against a player, the server notifies the manual operator at step 560. At step 562, one or more persons may determine and implement a sanction or other action.

If the tally of nickname complaints does not exceed the nickname escalation threshold, the server determines, at a decision step 590, whether the tally of nickname complaints exceeds a nickname ban threshold. If the tally of nickname complaints exceeds the nickname ban threshold (but is less than the nickname escalation threshold), the server automatically sends an indication to the selected player's console, at a step 592, causing the selected player's console to prohibit the selected player from using any nicknames. The nickname ban may be implemented for a predetermined number of days or whenever the selected player is communicating with the electronic community. Preferably, the nickname ban prohibits the selected player from remaining anonymous and forces the selected player to be identified by a unique account name to others in the electronic community.

As with other complaints described above, if any of the above nickname sanctions are implemented, the selected player is temporarily disconnected from the online service, at step 572, flushing all cached credentials for that player, forcing that player to logon again, and forcing the player to obtain new game tickets. If the tally of nickname complaints does not exceed any of the above nickname thresholds, control simply returns to the calling module with the effect of simply incrementing the tally of nickname complaints against the selected player that are stored by the server.

If the server determines that the received feedback was not a nickname complaint, the server determines, at a decision step 594, whether the received feedback is an account name complaint. An account name complaint reflects disapproval of the selected player's unique account name. Similar to a nickname, an account name may be lewd, profane, or otherwise objectionable to the submitter. If the received feedback is an account name complaint, the server updates a tally of account name complaints at a step 596. At a decision step 598, the server determines whether the tally of account name complaints exceeds an account name escalation threshold (generally, only after automated actions have been applied against the player, as noted below) that warrants intervention by one or more persons. If the tally of account name complaints exceeds the account name escalation threshold, the server notifies the manual operator at step 560. At step 562, one or more people may determine and implement a sanction or other action.

If the tally of account name complaints does not exceed the account name escalation threshold, the server determines at a decision step 600, whether the tally of account name complaints exceeds an account name change threshold. If the tally of account name complaints exceeds the account name change threshold (but is less than the account name escalation threshold), the server automatically forces the selected player to change the account name, at a step 602. The selected player's old account name is also added to a list of unaccepted account names at a step 604.

If any of the above account name sanctions are implemented, the selected player is temporarily disconnected from the online service, at step 572, flushing all cached credentials for that player, forcing that player to logon again, and forcing the player to obtain new game tickets. Preferably, this is the point at which the selected player must enter a new account name. If the tally of account name complaints does not exceed any of the above account name thresholds, control simply returns to the calling module with the effect of simply incrementing the tally of account name complaints against the selected player that are stored by the server. If the server determines that the received feedback was not an account name complaint, control passes via a connector B to the continued logic of FIG. 9.

Figure 9:
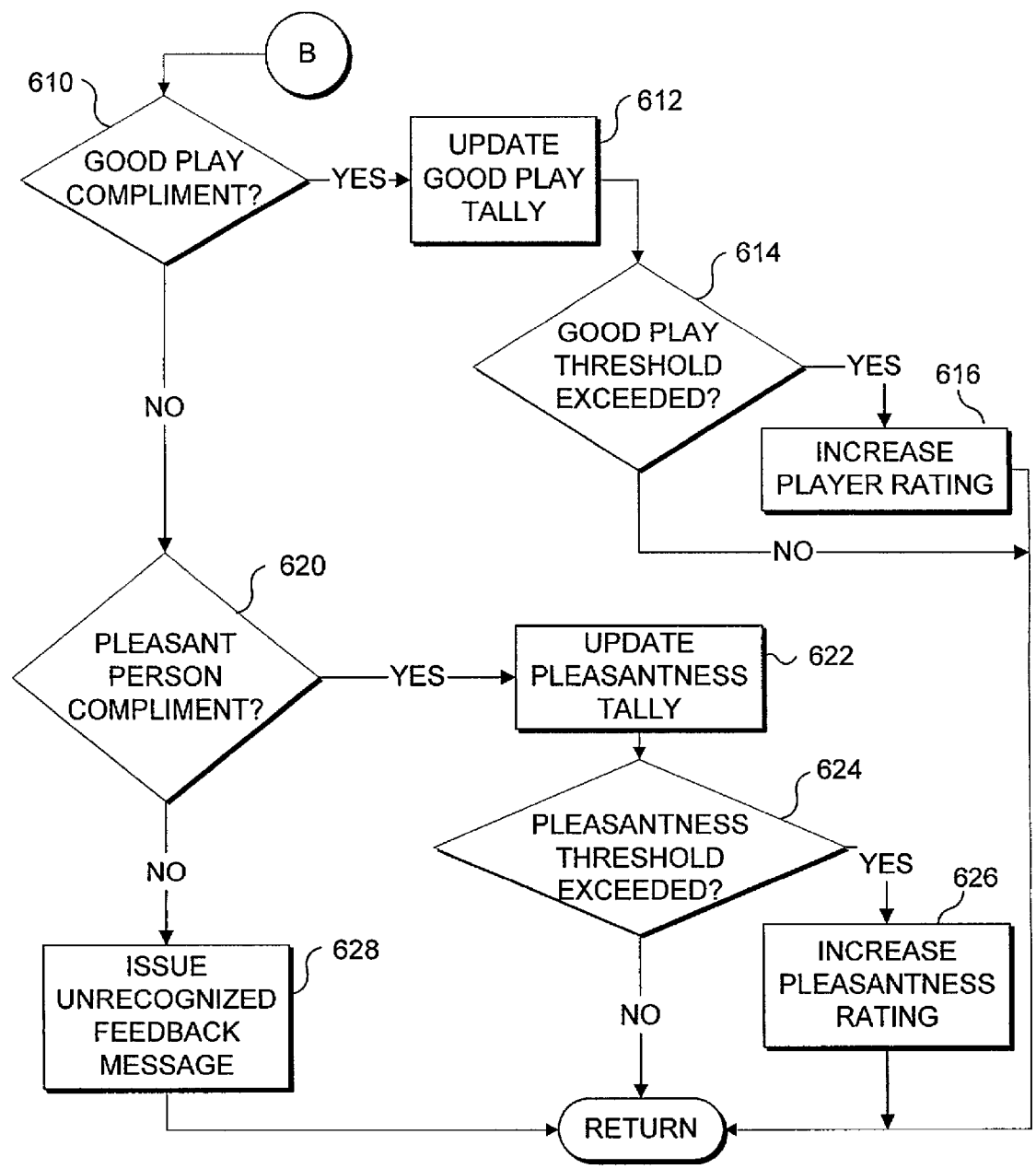
FIG. 9 is a flow diagram illustrating the logic used by the server to process positive feedback.

FIG. 9 is a flow diagram illustrating logic used by the server to process positive feedback. At a decision step 610, the server determines whether the received feedback is a compliment regarding the selected player's game play performance. Regardless of whether the selected player won the game, the submitter may feel that the selected player performed well in the game. If the received feedback was a good play compliment, the server updates a tally of good play compliments for the selected player, at a step 612. The server then determines, at a decision step 614, whether the tally of good play compliments exceeds a good play threshold. If the tally of good play compliments exceeds the good play threshold, the server automatically increases the selected player's rating at a step 616. A player's rating is an index that can be used to enable other players to choose the players with whom they wish to participate in game play. For example, a group of highly skilled or expert players may choose to limit their play to other players at their level of skill based on the player ratings index determined by feedback, rather than determined simply by technical performance as measured by the game itself. Those skilled in the art will recognize that a manual intervention threshold and action may also be implemented, if desired, but are not particularly relevant to positive feedback. Further, any number of other rewards may be implemented, such as providing the selected player with additional game capabilities, discounted game time, reduced fees for membership with the gaming site, or other rewards.

Analogously, the selected player may be rewarded for conduct other than game play performance. For instance, at a decision step 620, the server determines whether the received feedback is a compliment on the selected player's personal conduct during game play. For example, the selected player may have provided encouraging voice comments or otherwise acted courteously towards one or more other players during game play. If the received feedback is a compliment on the select player's personal conduct, the server updates a tally of "pleasantness" compliments at a step 622. At a decision step 624, the server determines whether the tally of pleasantness compliments exceeds a pleasantness threshold. If the tally of pleasantness compliments exceeds the pleasantness threshold, the server increases the player's pleasantness rating at a step 626. As indicated, ratings such as those described above may serve as an index that enables a player to request to play games only with players who have achieved one or more desired ratings. Those skilled in the art will recognize that other characteristics may be used for feedback and player association. If the server does not recognize the received feedback, the server issues a message to the submitter's console, at a step 628, indicating that the feedback was unrecognized.

Figure 10:
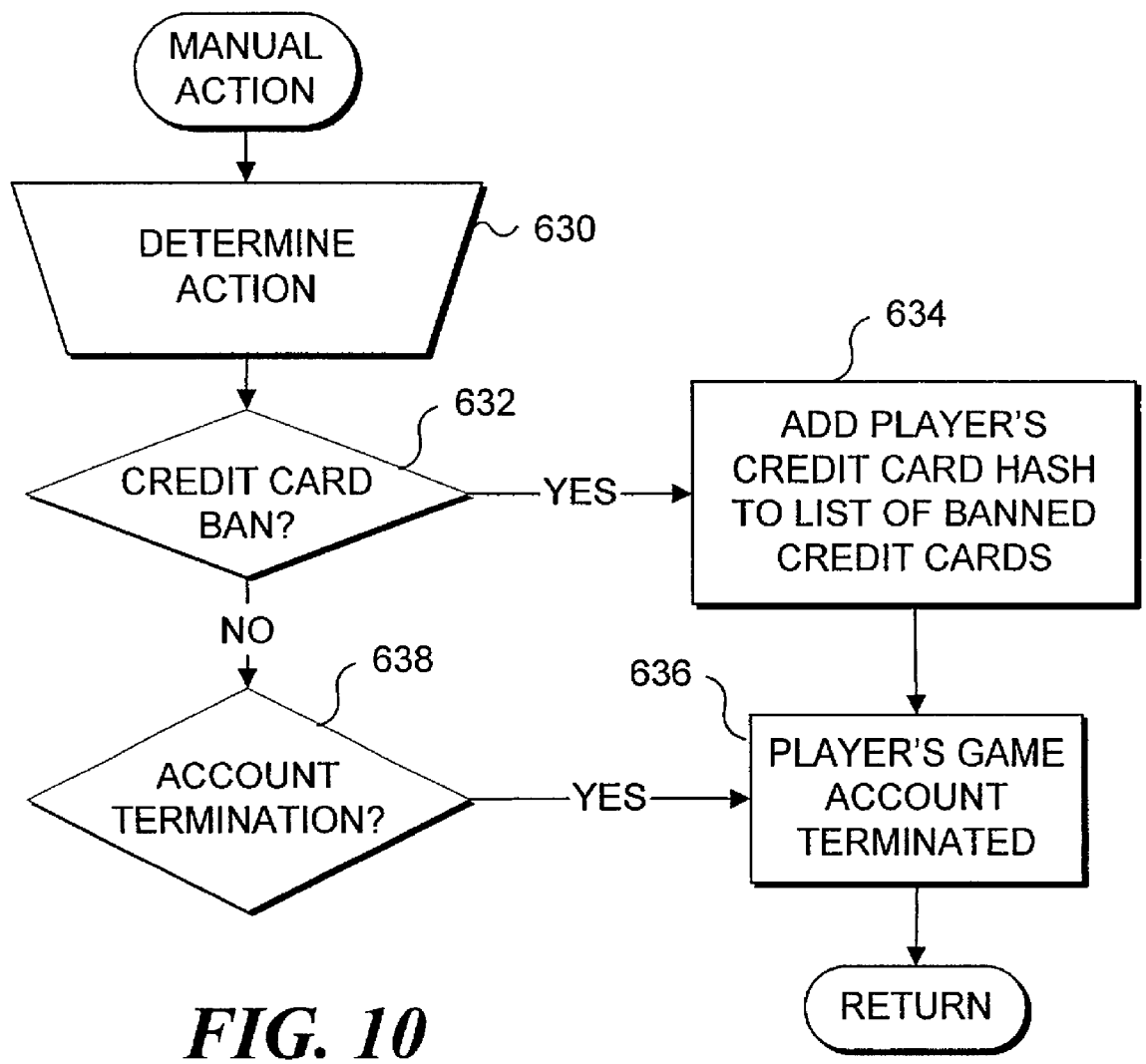
FIG. 10 is a flow diagram illustrating the logic for implementing manual actions in response to feedback.

FIG. 10 is a flow diagram illustrating logic for implementing manual actions. At a step 630, a manual operator or a group of people receives a notice that manual action is required and determine an action to take. For example, a selected player may have violated one or more of the above complaint thresholds, terms of service, code of conduct, or other community standard requiring manual intervention. The operator or one or more people handling manual actions may attempt to gather additional information from the submitters of the complaints, the selected player, or other players who have played against the selected player, if desired. If the operator or one or more people tasked with that function determine, at a decision step 632, that the selected player's credit card should be banned from use with the online game, a manual operator may instruct the server to add the selected player's credit card hash to a list of banned credit cards, at a step 634. To ensure the security of credit card numbers, no credit card numbers are stored on the server. Instead, when a player registers for an account, the player's credit card number is transformed by a secure hash function to create a credit card hash. Only the credit card hash is stored on the server. As indicated, a list of banned credit card hashes is maintained on the server to prevent banned players from using the credit card with the game service.

If the operator or other one or more people who are evaluating the specific player determines at a decision step 638 that the specific player may continue to use the existing credit card, but may no longer use the current account, the manual operator instructs the server to terminate the player's game account, at a step 636. Terminating a player's account deletes the player's stored statistics and other information, which most players would consider valuable. For example, the player's high score will be deleted as well as the player's accumulated characters, skins, and other game data. Note that the player's account is also terminated when the player's credit card is banned. However, if the player's account is terminated without banning the player's credit card, the player may establish a new account with the same credit card.

It is contemplated that manual rewards may also be provided, such as t-shirts, CDs, or other rewards that require manual intervention. As with sanctions, those skilled in the art will recognize that manually implemented rewards may instead be implemented automatically by the server.

Although the present invention has been described in connection with the preferred form of practicing it, those of ordinary skill in the art will understand that many modifications can be made thereto within the scope of the claims that follow. For example, the invention may allow or prohibit submitters from submitting feedback for themselves. Allowing submitters to submit feedback for themselves provides a comparative system that enables players to gauge how the submitters see themselves versus how others in the community see them. Such comparisons may enable submitters to adjust their personal conduct and/or game play to suit the standards of the community in which the submitter wishes to be a member, prior to incurring sanctions. As suggested above, those skilled in the art will also recognize that the present invention is applicable to electronic communities and activities other than games. For example, the present invention may be applied to text, voice, and/or video chat sessions, electronic work groups, electronic commerce communities, and other electronic communities that wish to be self regulating.

Further, the present invention may enable submitters to request, vote on, and create additional categories of feedback or delete categories of feedback. It is also contemplated that members of the electronic community may vote on an action to be taken as a result of one or more submissions of feedback. For example, when sufficient feedback is submitted, the server may automatically offer each member of the electronic community a list of actions that may be taken for or against the member for which the feedback was submitted. The server may then tally and evaluate the actions chosen by each member, and automatically perform the action most closely representing the choices made by the community of members.

It is further contemplated that more complex functions may be applied to the feedback rather than simply comparing against different threshold levels. For example, feedback may be weighted according to a category of conduct within which the feedback falls. Thus, a threshold may be exceeded and action may be taken more quickly when only a few reports of a particularly egregious conduct are received in a category. An appeal process may also be incorporated that enables a member to select from and submit extenuating circumstances believed to avoid or reduce the severity of a sanction. Accordingly, it is not intended that the scope of the invention in any way be limited by the above description, but instead be determined entirely by reference to the claims that follow.

The invention in which an exclusive right is claimed is defined by the following:

1. A method for maintaining behavioral standards of members in an electronic gaming community in response to input from the members of the electronic gaming community via a game console, the method comprising:

enabling a first member of the electronic gaming community to select at the game console a second member of the electronic gaming community;

enabling the first member to select, from a plurality of behaviors, a behavior performable by the second member, individual behaviors having an associated plurality of feedback indicators corresponding to the first member's perception of the second member's behavior, wherein the behavior comprises:

screaming over a voice channel,
cheating during game play,
using profanity or abusive language over the voice channel,
using profanity or abusive language in a text message,
using profanity or abusive language in a video message,
making unsolicited offers over the voice channel,
making unsolicited offers in the text message or another text message,
making unsolicited offers in the video message or another video message,
submitting inappropriate items to the electronic gaming community,
playing well in a game,
acting courteously during game play, or
complementing others during the game play;

enabling the first member to submit a feedback indicator to a server, wherein the feedback indicator is selected from the plurality of feedback indicators for the selected behavior, and wherein the submitting comprises determining a credential of the first member indicative of a level of credibility or influence associated with the first member and adjusting the feedback indicator as a function of the credential;

calculating, at the server, a tally corresponding to the feedback indicator, wherein the calculating is based on the level of credibility or influence associated with the first member;

determining whether the tally exceeds an automatic response threshold and performing an automatic response directed to the second member when the automatic response threshold is exceeded; and determining whether the tally exceeds an escalation threshold and notifying an operator when the tally exceeds the escalation threshold;

wherein the automatic response comprises at least one of:
limiting a communication by the second member with one or more other members of the electronic gaming community;
requiring the second member to perform an action before allowing the second member to participate in an activity of the electronic gaming community;
suspending the second member from participating in the activity of the electronic gaming community for a predetermined period;
terminating access of the second member to the electronic gaming community and deleting historical data concerning the second member in relation to the electronic gaming community;
fining the second member;
banning the second member from further use of a credit card in association with the electronic community;
granting the second member an additional privilege in the activity of the electronic gaming community;
granting the second member a discount;
granting the second member a rebate; or
assigning the second member to a subgroup of the electronic gaming community.

2. The method of claim 1, further comprising automatically adjusting the automatic response threshold as a function of feedback submitted.

3. The method of claim 2, wherein automatically adjusting the automatic response threshold comprises computing a percentage of members that will be affected by exceeding the automatic response threshold.

4. The method of claim 1, wherein the electronic gaming community engages in gaming, text communication, voice communication, video communication, electronic commerce, trading goods, trading services, or collaborative work.

5. The method of claim 1, wherein the plurality of behaviors are determined by the electronic gaming community.

6. A system comprising:
a game console configured to:
enable a first member of a electronic community to select a second member of the electronic community;
enable the first member to select, from a plurality of behaviors, a behavior performable by the second member, individual behaviors having an associated plurality of feedback indicators corresponding to the first member's perception of the second member's behavior,
wherein the behavior comprises:
screaming over a voice channel,
cheating during game play,
using profanity or abusive language over the voice channel,
using profanity or abusive language in text messages,
using profanity or abusive language in a video message,
making unsolicited offers over the voice channel,
making unsolicited offers in a text message or another text message,
making unsolicited offers in the video message or another video message,
submitting inappropriate items to the electronic community,
playing well in a game,
acting courteously during game play, or
complementing others during game play;
a server configured to:
enable the first member to submit a feedback indicator, wherein the feedback indicator is selected from the plurality of feedback indicators for the selected behavior, and wherein to submit comprises determining a credential of the first member indicative of a level of credibility or influence associated with the first member and adjusting the feedback indicator as a function of the credential;
calculate a tally corresponding to the feedback indicator, wherein to calculate is based on the level of credibility or influence associated with the first member;
determine whether the tally exceeds an automatic response threshold and performing an automatic response directed to the second member when the automatic response threshold is exceeded; and determine whether the tally exceeds an escalation threshold and notify an operator when the tally exceeds the escalation threshold, wherein the automatic response comprises at least one of:

limiting a communication by the second member with one or more other members of the electronic community;

requiring the second member to perform an action before allowing the second member to participate in an activity of the electronic community;

suspending the second member from participating in the activity of the electronic community for a predetermined period;

terminating access of the second member to the electronic community and deleting historical data concerning the second member in relation to the electronic community;

fining the second member;

banning the second member from further use of a credit card in association with the electronic community;

granting the second member an additional privilege in the activity of the electronic community;

granting the second member a discount;

granting the second member a rebate; or assigning the second member to a subgroup of the electronic community.

7. The system of claim 6, wherein the server is further configured to automatically adjust the automatic response threshold as a function of feedback submitted.

8. The system of claim 7, wherein to automatically adjust the automatic response threshold comprises computing a percentage of members that will be affected by exceeding the automatic response threshold.

9. The system of claim 6, wherein the electronic community engages in one of gaming, text communication, voice communication, video communication, electronic commerce, trading goods, trading services, or collaborative work.

10. The system of claim 6, wherein the plurality of behaviors are determined by the electronic community.

11. One or more computer readable storage media having instructions that, when executed by a computing device, implement a method comprising:

enabling a first member of an electronic gaming community to select, at a game console, a second member of the electronic gaming community;

enabling the first member to select, from a plurality of behaviors, a behavior performable by the second member, individual behaviors having an associated plurality of feedback indicators corresponding to the first member's perception of the second member's behavior, wherein the behavior comprises:

screaming over a voice channel, cheating during game play, using profanity or abusive language over the voice channel, using profanity or abusive language in a text message, using profanity or abusive language in a video message, making unsolicited offers over the voice channel, making unsolicited offers in the text message or another text message, making unsolicited offers in the video message or another video message, submitting inappropriate items to the electronic gaming community, playing well in a game, acting courteously during game play, or complementing others during game play;

enabling the first member to submit a feedback indicator to a server, wherein the feedback indicator is selected from the plurality of feedback indicators for the selected behavior, and wherein the submitting comprises determining a credential of the first member indicative of a level of credibility or influence associated with the first member and adjusting the feedback indicator as a function of the credential;

calculating, at the server, a tally corresponding to the feedback indicator, wherein the calculating is based on the level of credibility or influence associated with the first member;

determining whether the tally exceeds an automatic response threshold and performing an automatic response directed to the second member when the automatic response threshold is exceeded; and determining whether the tally exceeds an escalation threshold and notifying an operator when the tally exceeds the escalation threshold;

wherein the automatic response comprises at least one of:

limiting a communication by the second member with one or more other members of the electronic gaming community;

requiring the second member to perform an action before allowing the second member to participate in an activity of the electronic gaming community;

suspending the second member from participating in the activity of the electronic gaming community for a predetermined period;

terminating access of the second member to the electronic gaming community and deleting historical data concerning the second member in relation to the electronic gaming community;

fining the second member;

banning the second member from further use of a credit card in association with the electronic gaming community;

granting the second member an additional privilege in the activity of the electronic gaming community;

granting the second member a discount;

granting the second member a rebate; or assigning the second member to a subgroup of the electronic gaming community.

12. The one or more computer readable storage media of claim 11, further comprising automatically adjusting the automatic response threshold as a function of submitted feedback.

13. The one or more computer readable storage media of claim 12, wherein automatically adjusting the automatic response threshold comprises computing a percentage of members that will be affected by exceeding the automatic response threshold.

14. The one or more computer readable storage media of claim 11, wherein the electronic gaming community engages in one of gaming, text communication, voice communication, video communication, electronic commerce, trading goods, trading services, or collaborative work.

15. The one or more computer readable storage media of claim 11, wherein the plurality of behaviors are determined by the electronic gaming community.

* * * * *